United States Patent
Morita

(10) Patent No.: US 8,304,130 B2
(45) Date of Patent: Nov. 6, 2012

(54) MANUFACTURING METHOD OF A MEMBRANE ELECTRODE ASSEMBLY

(75) Inventor: Tohru Morita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 964 days.

(21) Appl. No.: 12/222,086

(22) Filed: Aug. 1, 2008

(65) Prior Publication Data

US 2009/0041947 A1 Feb. 12, 2009

(30) Foreign Application Priority Data

Aug. 8, 2007 (JP) ................................. 2007-206969

(51) Int. Cl.
*H01M 8/10* (2006.01)
*H01M 8/00* (2006.01)
*H01M 8/06* (2006.01)
*B05D 3/00* (2006.01)
*B05D 5/12* (2006.01)

(52) U.S. Cl. ........ 429/483; 429/413; 429/535; 427/115; 427/532

(58) Field of Classification Search .................. 429/188, 429/400–535; 427/515, 532, 115
See application file for complete search history.

(56) References Cited

U.S. PATENT DOCUMENTS

| 6,936,362 B2 * | 8/2005 | Chapman et al. ............. 429/430 |
| 2004/0110060 A1 * | 6/2004 | Yodoshi ......................... 429/44 |
| 2007/0166485 A1 * | 7/2007 | Matsumoto et al. ............ 428/13 |
| 2007/0224482 A1 * | 9/2007 | Shimoi et al. .................. 429/33 |
| 2008/0241681 A1 * | 10/2008 | Ito et al. ........................ 429/188 |
| 2009/0200172 A1 * | 8/2009 | Aoyama ......................... 205/88 |

FOREIGN PATENT DOCUMENTS

| JP | 04-233165 A | 8/1992 |
| JP | 2001-283874 A | 10/2001 |
| JP | 2002-216801 A | 8/2002 |
| JP | 2003-59504 A | 2/2003 |
| JP | 2003-217612 A | 7/2003 |
| JP | 2003-346833 A | 12/2003 |
| JP | 2004-87267 A | 3/2004 |
| JP | 2005-011590 A | 1/2005 |
| WO | WO 2007088471 A1 * | 8/2007 |

* cited by examiner

*Primary Examiner* — Patrick Ryan
*Assistant Examiner* — Alex Usyatinsky
(74) *Attorney, Agent, or Firm* — Kenyon & Kenyon LLP

(57) ABSTRACT

The present invention relates to a manufacturing method a membrane electrode assembly which has a low proton conduction resistance at a boundary of an electrolyte membrane and a catalyst layer. Catalyst ink including solvent, electrolyte 23 having proton permeability, and a carbon 26 supporting platinum is applied on both sides of an electrolyte membrane 4 having proton permeability. The solvent is evaporated for forming catalyst layers 10, 14. Voltage is applied between the catalyst layers 10, 14 under hydrogen atmosphere for forming proton conduction paths at boundaries between the catalyst layers 10, 14 and the electrolyte membrane 4.

4 Claims, 11 Drawing Sheets

APPLYING CATALYST INK ON BOTH SIDES (1)

APPLYING CATALYST INK ON BOTH SIDES (2)

APPLYING CATALYST INK ON ONE SIDE

APPLYING ELECTROLYTIC SOLUTION ON CATALYST LAYER

PRESSING ELECTROLYTIC SOLUTION

MANUFACTURING METHOD OF A MEMBRANE ELECTRODE ASSEMBLY

BACKGROUND OF THE INVENTION

1. Field of the Invention

The present invention relates to a manufacturing method of a membrane electrode assembly for fuel cells.

2. Background Art

A manufacturing method of a membrane electrode assembly is known in which organic solvent solution of polymeric electrolyte is applied on a catalyst layer, catalyst slurry is applied to an electrode of the other side and dried when an organic solvent residue in an electrolyte membrane decreases to a certain amount, and pinching by a hot press is executed (for example, it refers to patent document 1.)

Including the above-mentioned document, the applicant is aware of the following documents as a related art of the present invention.

[Patent Document 1] Japanese Patent Laid-Open No. 2002-216801
[Patent Document 2] Japanese Patent Laid-Open No. 2003-217612
[Patent Document 3] Japanese Patent Laid-Open No. 2004-87267

However, a proton path does not always open at a boundary between the electrolyte membrane and the catalyst layer. Accordingly, there is a possibility that good power generation feature cannot be obtained because of a high proton conductive resistance in such a boundary.

SUMMARY OF THE INVENTION

The present invention has been made to solve the above problems. It is an object of the present invention to provide a manufacturing method for manufacturing a membrane electrode assembly which has a low proton conductive resistance at a boundary between a electrolyte membrane and a catalyst layer.

The above object is achieved by a manufacturing method of a membrane electrode assembly for fuel cells. The method includes a step for applying catalyst ink including solvent, electrolyte having proton permeability, and a conductive support supporting catalyst on at least one surface of an electrolyte membrane having proton permeability. The method also includes a step for forming a catalyst layer including the electrolyte and the conductive support by evaporating the solvent included in the applied catalyst ink. The method further includes a step for applying voltage between the catalyst layer and the electrolyte membrane under atmosphere of proton supplying source.

The above object is also achieved by a manufacturing method of a membrane electrode assembly for fuel cells. The method includes a step for applying catalyst ink including solvent, electrolyte having proton permeability, and a conductive support supporting catalyst on at least one surface of an electrolyte membrane having proton permeability. The method further includes a step for applying voltage between the catalyst ink and the electrolyte membrane under atmosphere of proton supplying source, while evaporating the solvent included in the catalyst ink.

The above object is also achieved by a manufacturing method of a membrane electrode assembly for fuel cells. The method includes a step for providing a catalyst layer including electrolyte having proton permeability and a conductive support supporting catalyst on at least one surface of an electrolyte membrane having proton permeability. The method further includes a step for applying voltage between the catalyst layer and the electrolyte membrane under atmosphere of proton supplying source.

The above object is also achieved by a manufacturing method of a membrane electrode assembly for fuel cells. The method includes a step for applying electrolytic solution including solvent and electrolyte having proton permeability on at least one surface of a catalyst layer including electrolyte having proton permeability and a conductive support supporting catalyst. The method also includes a step for forming an electrolyte membrane by evaporating the solvent included in the applied electrolytic solution. The method further includes a step for applying voltage between the catalyst layer and the electrolyte membrane under atmosphere of proton supplying source.

The above object is also achieved by a manufacturing method of a membrane electrode assembly for fuel cells. The method includes a step for applying electrolytic solution including solvent and electrolyte having proton permeability on at least one surface of a catalyst layer including electrolyte having proton permeability and a conductive support supporting catalyst. The method further includes a step for applying voltage between the catalyst layer and the electrolytic solution under atmosphere of proton supplying source, while evaporating the solvent included in the electrolytic solution.

Other objects and further features of the present invention will be apparent from the following detailed description when read in conjunction with the accompanying drawings.

BEST MODE FOR CARRYING OUT THE INVENTION

Figure 1:
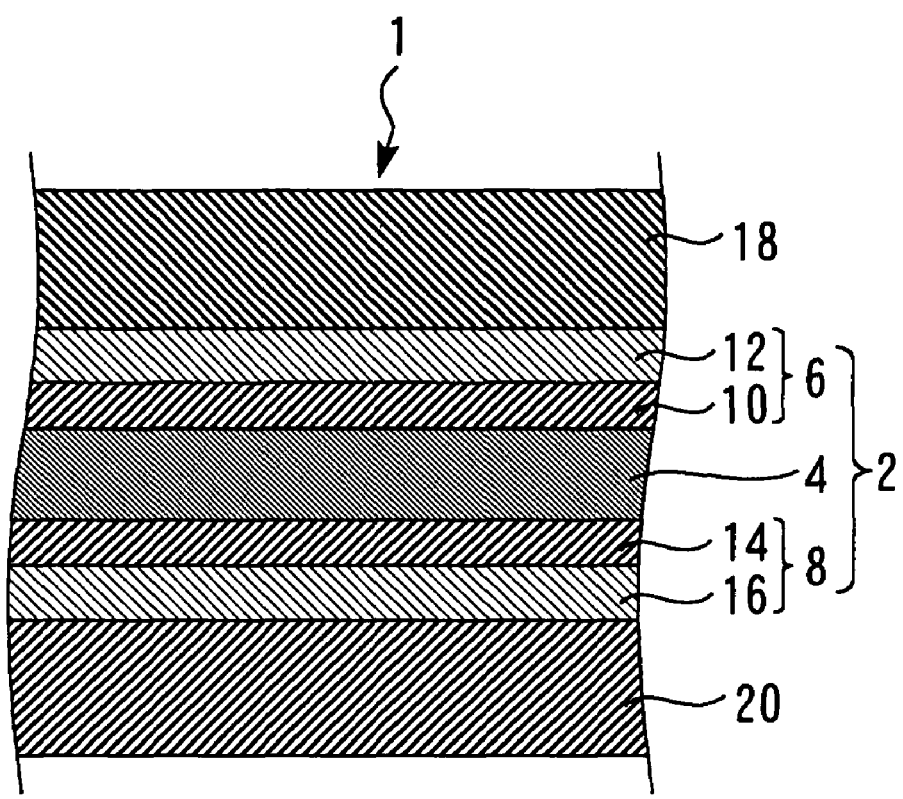
FIG. 1 is a cross sectional view showing a typical constructive example of a polymer electrolyte fuel cell.

Now, embodiments of the present invention will be described with reference to the drawings. Like reference numerals denote like components throughout the drawings, and redundant descriptions will be omitted.

FIG. 1 is a cross sectional view showing a typical constructive example of a polymer electrolyte fuel cell. A fuel cell 1 shown in FIG. 1 has a membrane electrode assembly (called "MEA" hereafter) 2. MEA2 has an electrolyte membrane 4 picked up with an anode electrode 6 and a cathode electrode 8.

The electrolyte membrane 4 has character to make proton (a hydrogen ion) transmit. In detail, the electrolyte membrane 4 is a solid polymeric electrolyte membrane having a sulfonate group (SO3H group) contributing to conduction of the proton. For example, Nafion (a product made in DuPont Company) which is perfluorosulfonic acid polymer, Flemion (a product made in Asahi Glass Co., Ltd.) and Aciplex (a product made in Asahi Chemical Industry Co., Ltd.) can be used for the electrolyte membrane 4. In these velar others, In addition to the fluorine-based membrane, a hydrocarbon corollary polymer can be used for the electrolyte membrane 4.

The anode electrode 6 includes a catalyst layer 10 and a gas diffusion layer (called "GDL" hereafter) 12. Likewise, the cathode electrode 8 includes a catalyst layer 14 and GDL16. For example, GDLs 12, 16 can be made of carbon materials which water-repellent attention was made on by fluorine resin. Separators 18, 20, for example, made of carbon materials are provided outside of the GDLs 12, 16, respectively. Inside of the separators 18, 20 are provided with passages for reaction gases (hydrogen, air), which is not shown in figure, respectively.

As follows, an assembled body of the catalyst layer 10; the electrolyte membrane 4; and the catalyst layer 14 are called "MEA". Manufacturing method of the MEA will be described in detail in following description of preferred embodiments and variations.

First Embodiment

FIGS. 2A to 3B are sectional views for describing a manufacturing method of an MEA according to the first embodiment of the present invention.

Figure 2A:
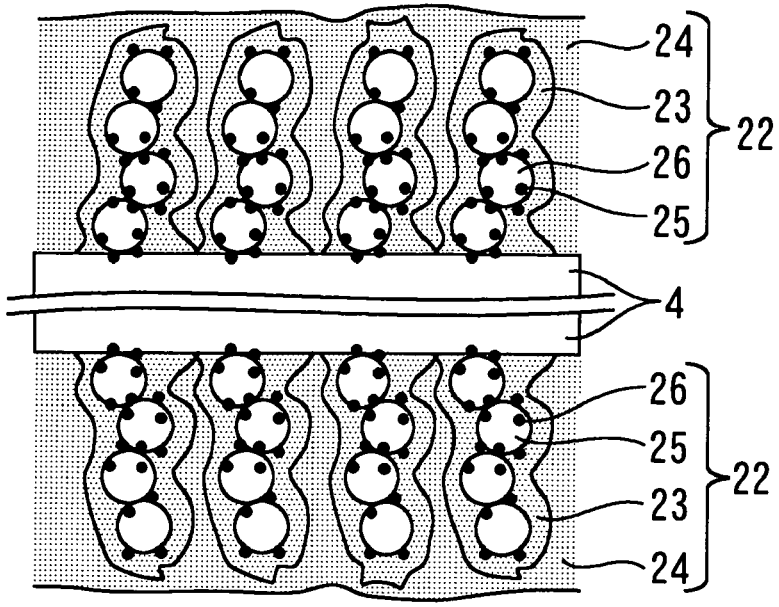
FIGS. 2A to 3B are sectional views for describing a manufacturing method of an MEA according to the first embodiment of the present invention.

Firstly, as shown in FIG. 2A, catalyst ink 22 is applied (formed in the shape of plane) on the both sides of the electrolyte membrane 4. For example, spray method or applicator method can be employed for the application of the catalyst ink 22. The catalyst ink 22 includes polymeric electrolyte 23, solvent 24, and conductive support supporting catalyst 25. As same as in a case of the above described electrolyte membrane 4, for example, Nafion, Flemion or the likes that is perfluorosulfonic acid polymer having a sulfonate group can be used for the polymeric electrolyte 23. For example, platinum can be used for the catalyst 25. For example, carbon powders can be used for the conductive support 26. The platinous percentage to the carbon powders can be assumed 5-80 wt %, for example.

Figure 2B:
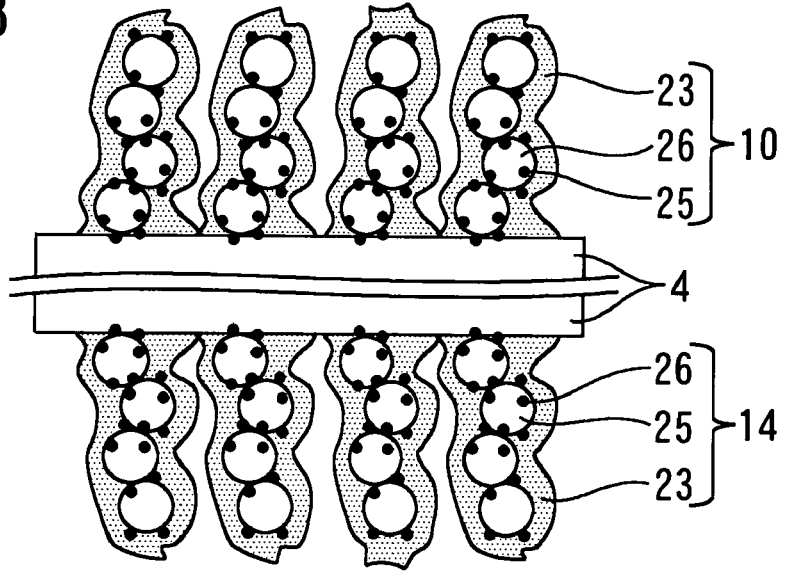

Next, solvent 24 included in catalyst ink 22 is vaporized. As a result, catalyst layers 10, 14 are formed on both sides of the electrolyte membrane 4, as shown in FIG. 2B. As a manner to vaporize solvent 25 in the catalyst ink 22, heating on a hot plate, or vacuum drying using a vacuum dryer can be employed in addition to natural drying.

Figure 3A:
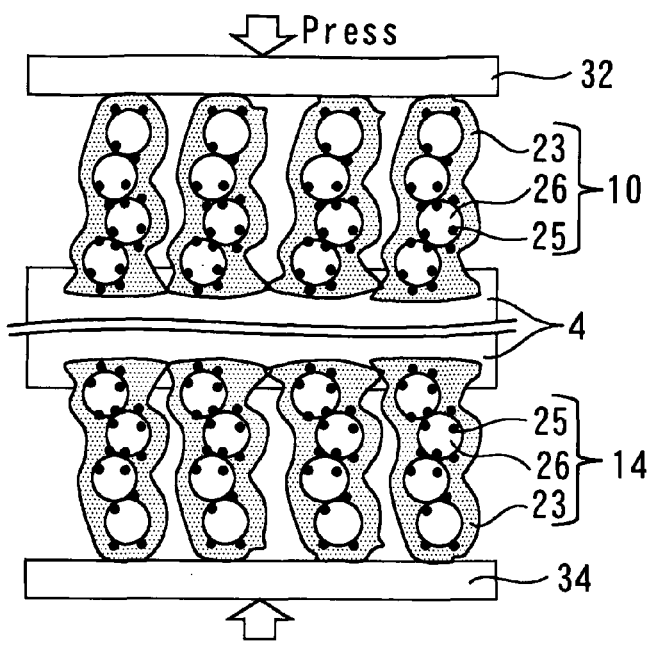

Afterwards, as shown in FIG. 3A, catalyst layer 10,14 are pinched by plates 32,34 (described later) from top and bottom, so as to be pressed (pressurized). The pressure of pressing is, for example, 0.1 MPa-20 MPa. As a result of the pressing, catalyst layers 10, 14 physically get in the electrolyte membrane 4. It is preferable that relative humidity is controlled around 95% to make it easy to entrap the catalyst layers 10, 14 in electrolyte membrane 4. Further, heating during the pressing (in other words, hot press) is preferred to make it easy to entrap catalyst layers 10, 14 in the electrolyte membrane 4. In a case where the electrolyte membrane 4 or the polymeric electrolyte 23 includes fluorine-based polymer, creep arises when the temperature exceeds 120 degrees Celsius which accords with the glass-transition temperature. It is, therefore, preferable that the temperature during the pressing is controlled between 30 degrees Celsius and 120 degrees Celsius, more preferably, it is controlled between 80 degrees Celsius and 120 degrees Celsius, in such a case. On the other hand, when the electrolyte membrane 4 or the polymeric electrolyte 23 includes hydrocarbon-based polymer, it is preferable that the temperature during the pressing is controlled between 30 degrees Celsius and 250 degrees Celsius since the hydrocarbon-based polymer has high heat resistance.

Figure 3B:
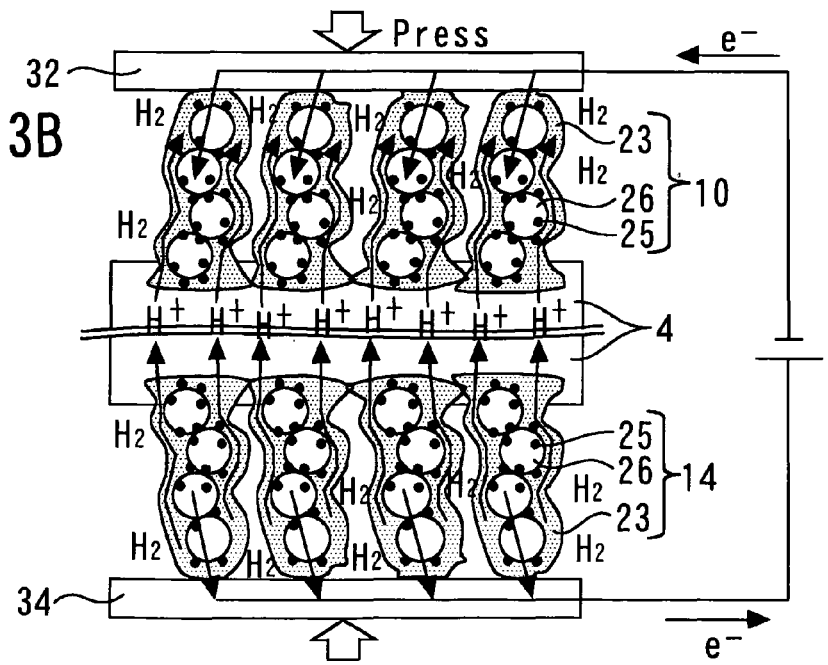

Further, as shown in FIG. 3B, certain voltage is applied between the catalyst layers 10 and 14 (the catalyst layer 14/the electrolyte membrane 4/the catalyst layer 14) while the catalyst layers 10, 14 are kept pressed in hydrogen atmosphere (humidified atmosphere). More concretely, the certain voltage is applied to plates 32, 34 which pinch the catalyst layers 10, 14.

Figure 4:
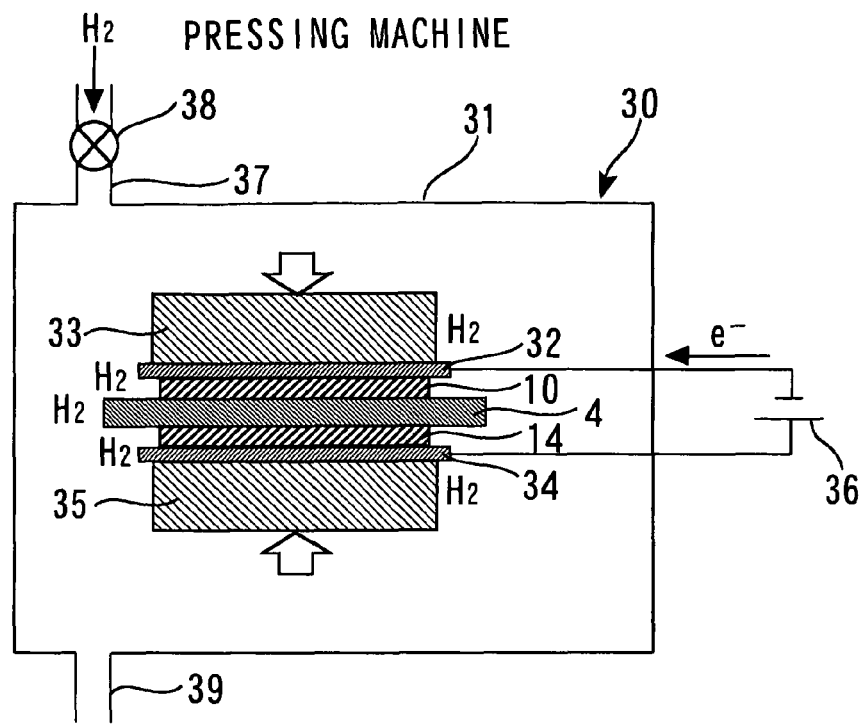
FIG. 4 shows a pressing machine which is employed in the first embodiment of the present invention.

FIG. 4 shows a pressing machine which can be employed for the pressing and the voltage application discussed above. The pressing machine 30 has a treatment chamber 31. In the treatment chamber 31, platens 33, 35 are provided at a upper side and a lower side so as to be parallel with each other. The under face of the upper platen 33 is provided with an electronic conductive plate 32. The top face of the lower platen 35 is provided with an electronic conductive plate 34. The catalyst layers 10, 14 discussed above are pinched with the electronic conductive plates (which may be called "plate" hereafter) 32, 34. It is preferable that the plates 32, 34 are made of a material that has low reactivity with the catalyst-layers 10, 14 and the electrolyte membrane 4 (e.g., gold or platinum). The pressing can be executed by driving the platens 33, 35. When a bulb 38 opens, hydrogen including moisture is supplied through a hydrogen supplying pipe 37 into the treatment chamber 31. As a result, hydrogen ambient atmosphere (which is humidified) is introduced around the catalyst layers 10, 14 and the electrolyte membrane 4. The plates 32, 34 can be applied with voltage by a voltage applying unit 36. Well-known potentiostat and galvanostat can be employed as the voltage applying unit 36. Further, an exhaust pipe 39 is connected to the treatment chamber 31.

As shown in FIG. 3B, protons are transmitted in a direction toward negative voltage from the positive voltage when applied with voltage under hydrogen atmosphere. In detail, as shown in FIG. 3(B), the protons are firstly transmitted from the electrolyte 23 of the catalyst layer 14 toward the electrolyte membrane 4, then, transmitted from the electrolyte membrane 4 toward the electrolyte 23 of the catalyst layer 10.

As a result, sulfonate groups which contributes to conduction of protons gather while making their direction the same, so as to form conductive paths of protons (called "proton conduction paths" hereafter) at the boundary of the catalyst layer 14 and the electrolyte membrane 4 as well as at the boundary of the electrolyte membrane 4 and the catalyst layer 10. Even more particularly, superior proton conduction paths can be obtained also within the catalyst layers 10, 14 and the electrolyte membrane 4. More concretely, proton conduction paths destroyed within the electrolyte 23 or the electrolyte membrane 4 by the pressing or other factors are reproduced.

It is preferable that the proton conduction velocity is controlled within a range of, for example, 0.01-2.5 A/cm$^2$. The control of the proton conduction velocity can be implemented by setting the supplying voltage within 1 mV-1V. The voltage applying time can be set within 10 sec-24 hr.

Preferably, the proton conduction velocity and the voltage applying time are set so as to correspond to a material of the electrolyte 23 included in the catalyst layers 10, 14. Fluorine-based polymer is tender as compared to hydrocarbon-based polymer. Because of this, the proton conduction velocity can be lowered, and the voltage applying time can be shortened, when fluorine-based polymer is employed for the electrolyte 23 as compared to a case where hydrocarbon-based polymer is employed.

Also, it is preferable that the proton conduction velocity and the voltage applying time are set so as to correspond to the dosage of the sulfonate group included in the polymeric electrolyte 23. The proton conduction paths can be formed by lower proton conduction velocity and shorter voltage applying time when there is much dosage of the sulfonate group, as compared to little case. When there is little dosage of the sulfonate group, e.g., EW>1,100, the voltage applying time can be set within 10 min-24 hr. On the other hand, when there is much dosage of the sulfonate group, e.g., EW-≦1100, the voltage applying time can be set within 10 sec-30 min. Here, EW (equivalent weight) means dry membrane weight per 1 mol of sulfonate group. That is, it means that dosage of the sulfonate group is higher as EW is smaller.

The MEA can be obtained when the voltage application and the pressing is finished after elapse of the preset voltage applying time from the start of the voltage application. At this stage, the sulfonate groups which gather during the voltage application at the boundaries between the catalyst layers 10, 14 and the electrolyte membrane 4 while making their directions the same will be intertwined with each other. Accordingly, a state in which the proton conduction paths are kept is maintained even after the voltage application and the pressing are finished.

As follows, an example in which the above described first embodiment is further made concrete will be described.

FIRST EXAMPLE

Catalyst ink including Nafion (EW 1,100) and carbon which supports Pt is applied by a spray method to both sides of an electrolyte membrane (Nafion) that is made of fluorine-based polymer. Then, the solvent of the applied catalyst ink was vaporized (that is, the catalyst ink is dehumidified), so as to form the catalyst layers. Afterwards, the catalyst layers of the both sides are pinched by the plates 32, 34 of the pressing machine 30 shown in FIG. 4. The inside of the treatment chamber 31 is filled with hydrogen ambient atmosphere (which is humidified). Then, the catalyst layer/polymeric electrolyte/catalyst layers are pressed in 1.5 MPa. During the pressing, the plates 32, 34 are heated so that the temperature of the catalyst layers and the polymeric electrolyte are controlled to 80 degrees Celsius. Further, voltage of several 10 mV is applied between the plates 32, 34 so that the proton conduction velocity is controlled to 1.0 A/cm². After 10 min voltage application, that is, after performing the proton conduction processing for 10 min, the pressing and the voltage application are finished so as to obtain the MEA.

SECOND EXAMPLE

Similar to the first example, catalyst ink 22 is applied by a spray method to both sides of the electrolyte membrane. After the catalyst ink is dry-up, the pressing and the voltage application are performed by using the pressing machine 30 shown in FIG. 4. The pressing pressure in the first example is assumed 1.5 MPa, but the pressing pressure in the present second example is 0.6 MPa. The other conditions (temperature, proton conduction velocity, voltage applying time) are the same as those in the first example.

THIRD EXAMPLE

Similar to the first example, catalyst ink is applied by a spray method to both sides of the electrolyte membrane. After the catalyst ink is dry-up, the pressing and the voltage application are performed by using the pressing machine 30 shown in FIG. 4. The pressing pressure in the first example is assumed 1.5 MPa, but the pressing pressure in the present third example is 3.0 MPa. The other conditions are the same as those in the first example.

COMPARATIVE EXAMPLE

Similar to the first example, catalyst ink is applied by a spray method to both sides of the electrolyte membrane. After the catalyst ink is dry-up, the catalyst layers of the both sides are pinched by the plates 32, 34 of the pressing machine 30 shown in FIG. 4, so as to press the catalyst layer/the electrolyte membrane/the catalyst layer with 3 MPa for 4 min in atmospheric atmosphere. During the pressing, the plates 32, 34 are heated, so that the temperature of the catalyst layers and the electrolyte membrane is controlled to 140 degrees Celsius. In the present comparative example, as different with the above described first to third examples, there is not performed the voltage application in the hydrogen atmosphere. That is, in the present comparative example, the MEA is obtained without executing a proton conduction processing in which proton conduction paths are formed by force.

Figure 5:
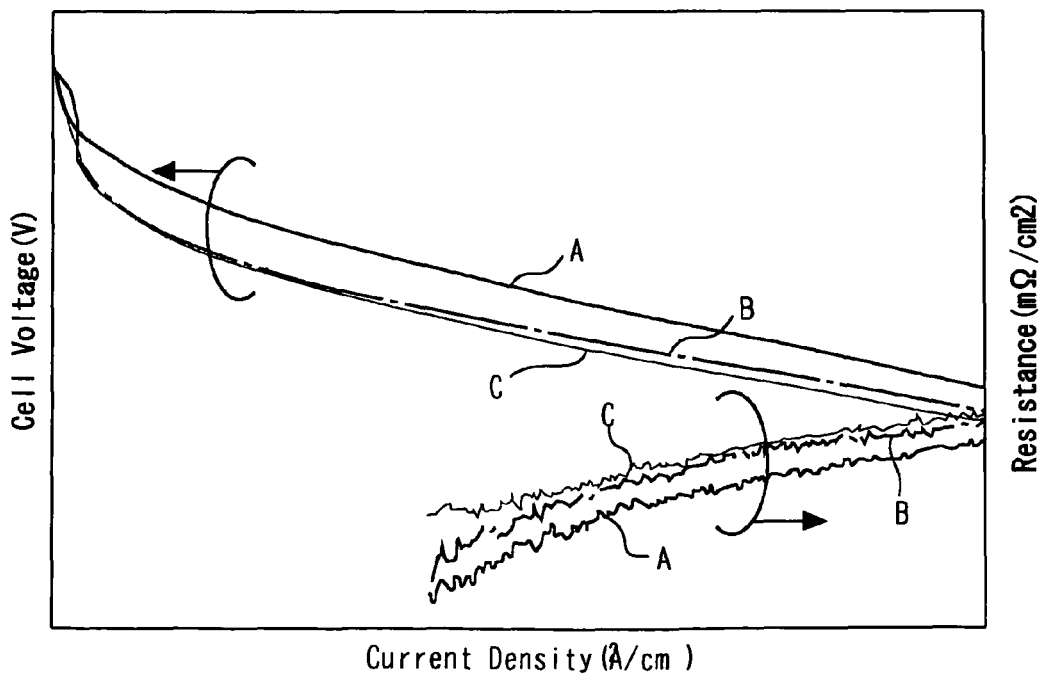
FIG. 5 is a diagram for describing power generation characteristics (resistance, cell voltage) of the fuel cell having the MEA provided by the first embodiment of the present invention.

The inventor of the present invention examines power generation characteristics of fuel cells which are manufactured by forming GDLs on the outside of the MEAs obtained by the above-mentioned first to third examples and the comparative example, respectively, before further forming separators on the outward of the GDLs. The result is shown in FIG. 5. FIG. 5 is a diagram for describing the power generation characteristics (resistance, cell voltage) of the fuel cell having the MEA provided by the embodiment of the present invention. Bold lines A shown in FIG. 1 indicate the power generation characteristics of the fuel cell having the MEA provided by the first or third example. Broken lines B indicate the power generation characteristics of the fuel cell having the MEA provided by the second example. Thin lines C indicate the power generation characteristics of the fuel cell having the MEA provided by the comparative example.

Here, the cell resistance is a result measured by a current cut-off method. Further, power generation conditions are as follows: cell temperature is 80 degrees Celsius; H2 gas flow quantity is 500 sccm; H2 gas pressure is 0.2 MPa; air flow quantity is 2000 sccm; and air gas pressure is 0.2 MPa.

As shown in FIG. 5, the fuel cells having the MEAs provided by the first to third examples have lower resistance (proton conduction resistance) and higher cell voltage as compared to those of the fuel cell having the MEA provided by the comparative example. It means that it is possible to improve the power generation characteristics of the fuel cells by applying voltage under hydrogen ambient atmosphere (which is humidified) so as to form the proton conduction paths at the boundaries between the catalyst layers 10, 14 and the electrolyte membrane 4 as well as to reproduce the proton conduction paths within the catalyst layers 10, 14 and the electrolyte membrane 4.

Further, as for the MEA obtained by the comparative example, the resistance of the fuel cell is determined by proton conduction paths which are formed when electric power is generated. The MEAs that are provided by the first to third examples of the present invention have the proton conduction paths formed by the above described voltage application, in addition to the proton conduction paths that are formed when electric power is generated. Accordingly, the proton conduction resistance is lowered in the MEAs according to the present invention.

As for a manner for forming the proton conduction paths, it can be contemplated that making the fuel cells generate electricity beforehand. However, when the fuel cells generate the electricity, supplies of the hydrogen gas which is the proton source and the oxygen gas is obstructed by generated water. According to the present embodiment, it is possible to supply the hydrogen gas uniformly around the catalyst layers 10, 14 since there is generated no water. Accordingly, the present embodiment can form a lot of proton conduction paths uniformly.

As discussed above, in the first embodiment, the electrolyte membrane 4 and the catalyst layers 10, 14 are pinched, and voltage is applied to the catalyst layers 10, 14 under hydrogen ambient atmosphere (which is humidified) in the first embodiment. As a result, proton conduction paths are formed at the boundaries between the catalyst layers 10, 14 and the electrolyte membrane 4, as well as the proton conduction paths are reproduced within the electrolyte membrane 4 and the electrolyte 23. Forming the proton conduction paths in force as described above can decrease the resistance of the fuel cells, whereby the cell voltage can be increased. Accordingly, the first embodiment can improve the power generation characteristics of the fuel cells.

Further, according to the first embodiment, the voltage can be applied under a state in which the catalyst layers 10, 14 are pressed, in other words, in which large contact surface is obtained between the catalyst layers 10, 14 and the electrolyte membrane 4. The first embodiment, therefore, can form more proton conduction paths as compared to a case in which the pressing is not performed. As a result, it is possible to further improve the power generation characteristics of the fuel cells.

Variations of the first embodiment will be described hereinafter. It is assumed that the materials and the process conditions which are described in the above described first embodiment 1 can be employed, unless it is particularly shown by contraries.

It is assumed that hydrogen ambient atmosphere is employed as the proton supplying source atmosphere in the above described first embodiment. However, it may be possible to form the proton supplying source atmosphere by volatilizing organic solvent such as methyl alcohol or ethanol. (This variation can be also applicable to a second embodiment described below.)

(First Variation)

Figure 6:
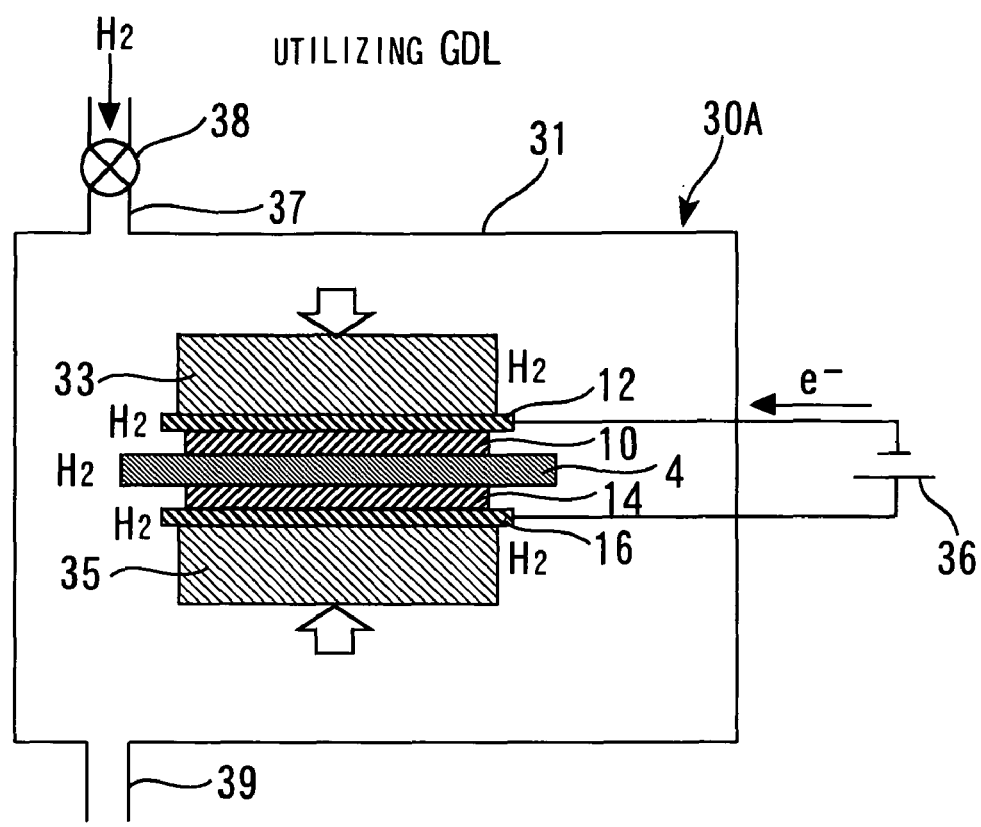
FIG. 6 shows the GDLs 12, 16 that are applied with the voltage in the first variation of the first embodiment of the present invention.

In the first embodiment, the voltage is applied to the plates 32, 34 pinching the catalyst layers 10, 14. However, the voltage may be applied to the GDLs 12, 16 that are provided outward of the catalyst layers 10, 14, as shown in FIG. 6. FIG. 6 shows the GDLs 12, 16 that are applied with the voltage in the first variation of the first embodiment.

In the first variation, the catalyst layers 10, 14 are formed at first by vaporizing the solvent 24 of the catalyst ink 22 that is applied to the both surface of the electrolyte membrane 4. Then, the GDLs 12, 16 are formed on the outside of the catalyst layers 10, 14. Next, GDLs 12, 16 are pinched by the platens 33, 34 so as to be pressed in the pressing machine 30A shown in FIG. 6. Afterwards, voltage is applied to the GDLs 12, 16 by a voltage applying unit 36 under hydrogen ambient atmosphere (which is humidified). Even if there are not the plates 32, 34, proton conduction paths can be formed at the boundary between the catalyst layer 14 and the electrolyte membrane 4 as well as the boundary between the electrolyte membrane 4 and the catalyst layer 10, as same as the first embodiment. Further, proton conduction paths can be reproduced within the electrolyte membrane 4 and within the electrolyte 23 of the catalyst layers 10, 14. Thus, according to the first variation, an advantageous result similar to that achieved in the first embodiment can be obtained.

(Second Variation)

In the above described first embodiment, the catalyst ink 22 is applied to the both sides of the electrolyte membrane 4. However, the catalyst ink 22 may be formed at least one side of the electrolyte membrane 4, as shown in FIGS. 7A to 7D. FIGS. 7A to 7D are cross sectional views for describing a manufacturing method of an MEA according to the second variation of the first embodiment.

Figure 7A:
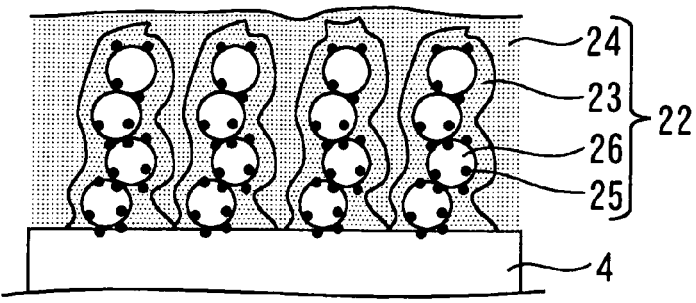
FIGS. 7A to 7D are sectional views for describing a manufacturing method of an MEA according to the second variation of the first embodiment of the present invention.
Figure 7B:
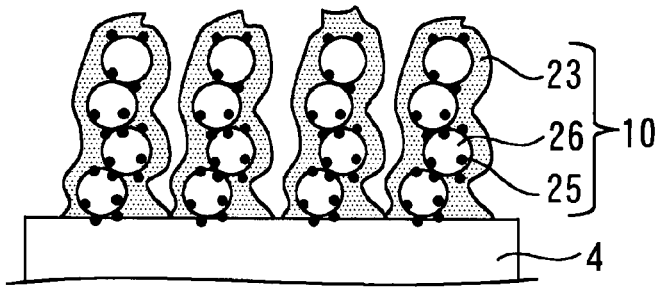
Figure 7C:
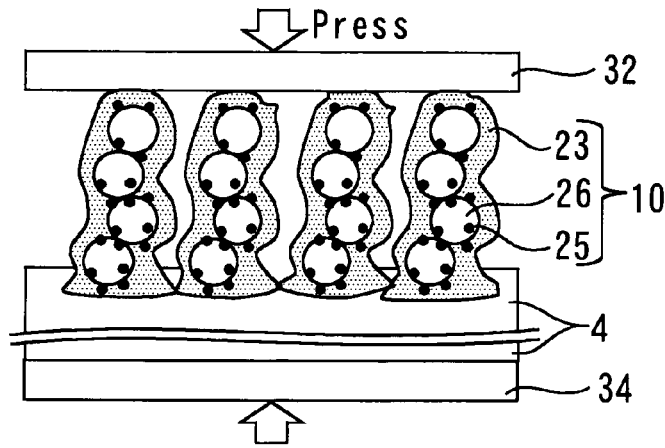
Figure 7D:
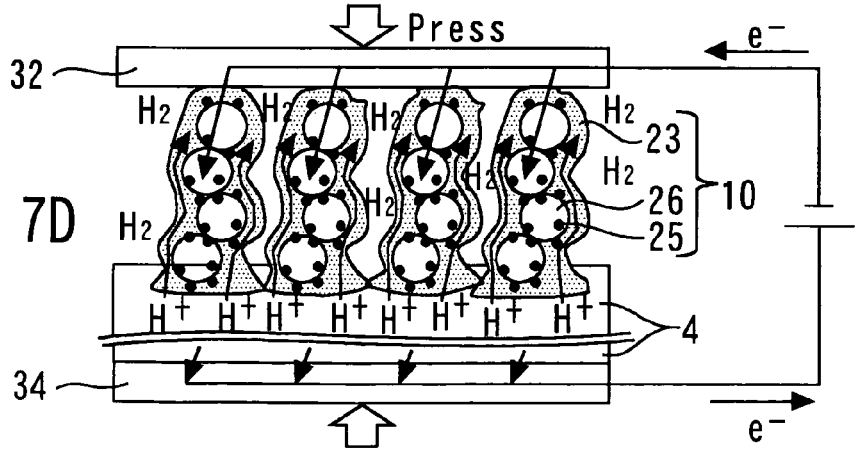
Figure 8:
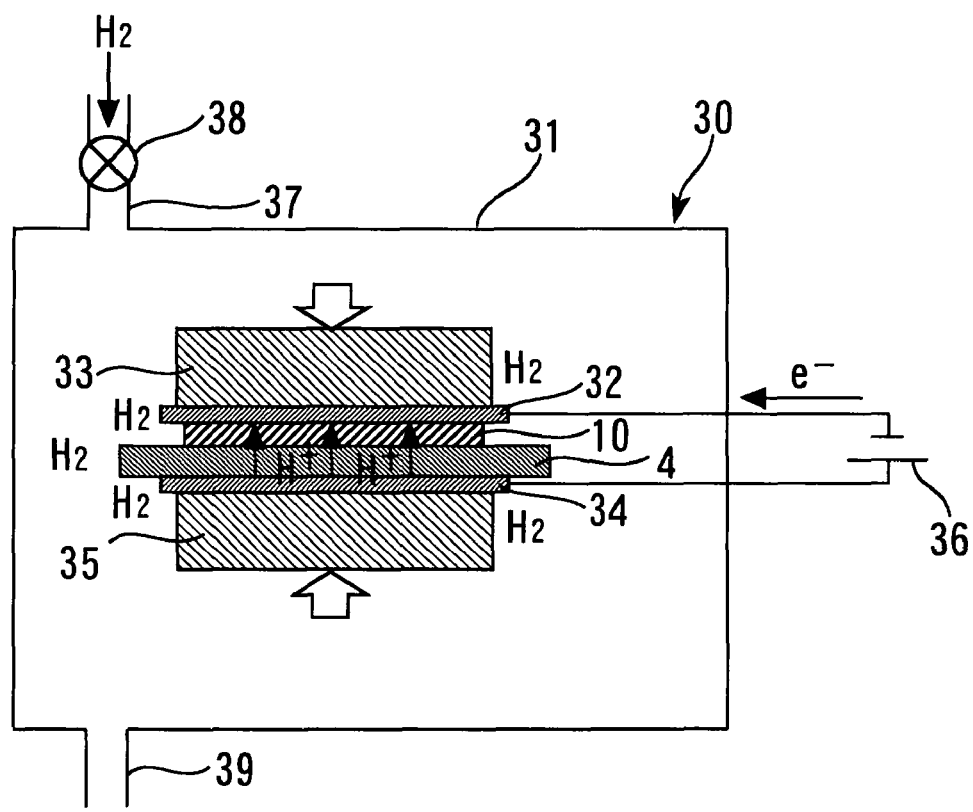
FIG. 8 shows the catalyst layer 10 and the electrolyte membrane 4 that are applied with the voltage in the second variation of the first embodiment of the present invention.

In the second variation, catalyst ink 22 is applied by a spray method to one side of the electrolyte membrane 4 at first, as shown in FIG. 7A. Next, solvent 24 included in the applied catalyst ink 22 is vaporized so as to form a catalyst layer 10 on the one side of the electrolyte membrane 4, as shown in FIG. 7B. Afterwards, the catalyst layer 10 and the electrolyte membrane 4 are pinched by the plates 32, 34 from top and bottom so as to be pressed, as shown in FIG. 7C. Due to the above process, the catalyst layer 10 gets into the electrolyte membrane 4 physically. Further, voltage is applied between the catalyst layer 10 and the electrolyte membrane 4 under hydrogen ambient atmosphere (which is humidified), while the catalyst layer 10 and the electrolyte membrane 4 are still pressed, as shown in FIG. 7D. To be concrete, the plates 32, 34 are applied with voltage by a voltage applying unit 36, under a situation in which hydrogen ambient atmosphere (which is humidified) is introduced into the treatment chamber 31 of the pressing machine 30, and pressing is performed, as shown in FIG. 8. After completion of the voltage application for a predetermined time, another catalyst layer 14 is formed on the other side of the electrolyte membrane 4 (not shown in Figures) so as to be applied with voltage and pressed under hydrogen ambient atmosphere (which is humidified), according to the above described procedures. As a result, proton conduction paths are formed at the boundary between the catalyst layer 14 and the electrolyte membrane 4 as well as at the boundary between the electrolyte membrane 4 and the catalyst layer 10, as same as the case in the first embodiment. Further, according to the second variation, it is possible to change the amount of the proton conduction paths at the boundary between the catalyst layer 10 and the electrolyte membrane 4 from the amount of the proton conduction paths at the boundary between the catalyst layer 14 and the electrolyte membrane 4, although the number of process steps increases.

(Third Variation)

In the above described first embodiment, solvent 24 of the catalyst ink 22 is vaporized before pressing. However, pressing may be performed before vaporizing the solvent 24 of the catalyst ink 22, as shown in FIGS. 9A to 9D. FIGS. 9A to 9D are cross sectional views for describing a manufacturing method of an MEA according to a third variation of the first embodiment. For a simplification purpose, only upper part than the electrolyte membrane 4 (the catalyst layer 10 side) is shown in FIGS. 9A to 9D.

Figure 9A:
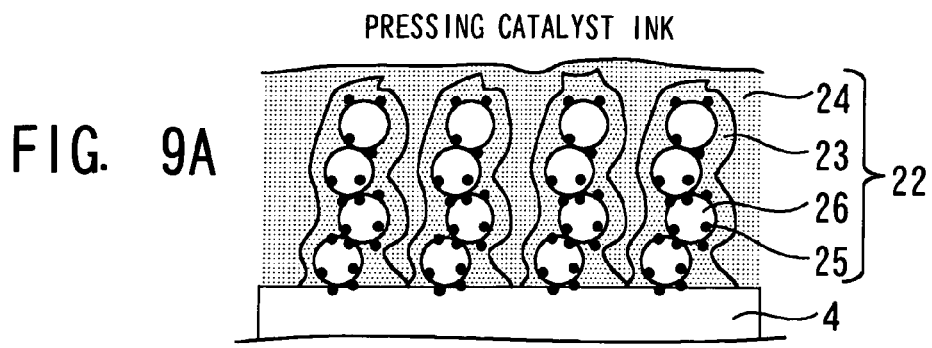
FIGS. 9A to 9D are sectional views for describing a manufacturing method of an MEA according to the third variation of the first embodiment of the present invention.
Figure 9B:
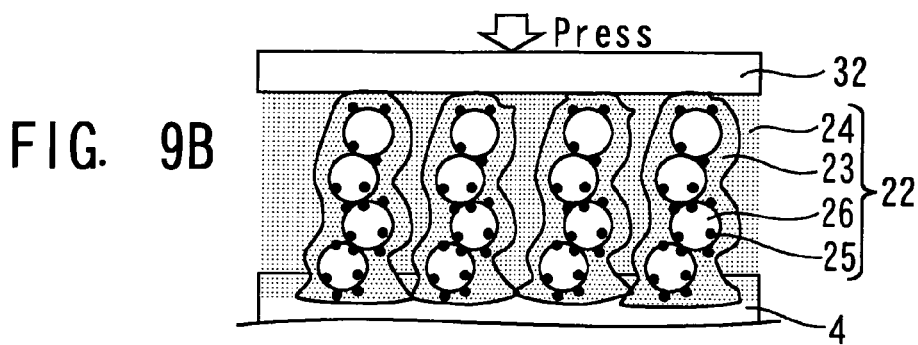
Figure 9C:
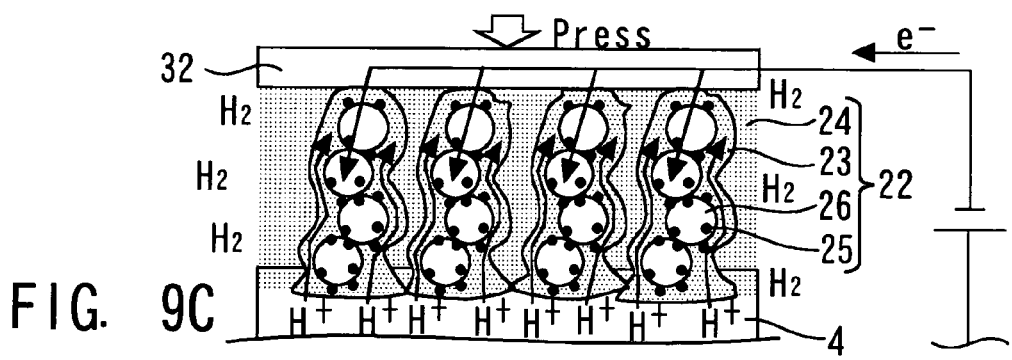
Figure 9D:
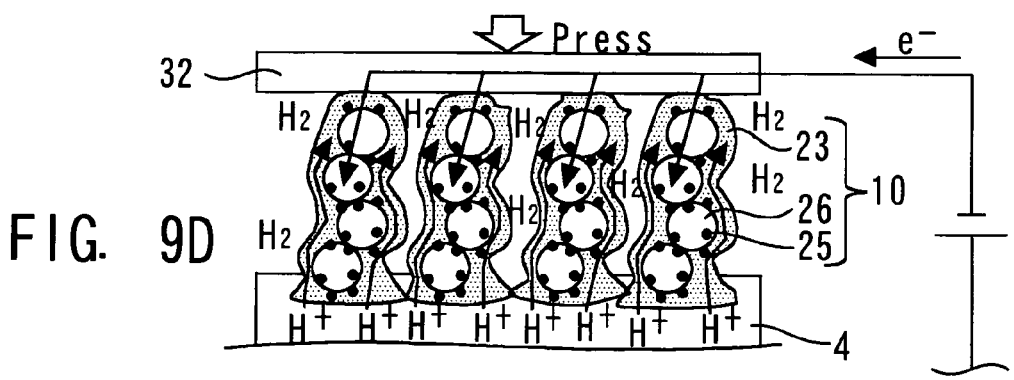

According to the third variation, catalyst ink 22 is applied by a spray method to both sides of the electrolyte membrane 4 at first, as shown in FIG. 9A. Then, pressing is performed while the applied catalyst ink 22 still includes solvent 24. That is, the catalyst ink 22 applied to the both sides are pinched by the plates 32, 34 from top and bottom, so as to be pressed, as shown in FIG. 9B. As a result, the catalyst ink 22 gets into the electrolyte membrane 4 physically. Afterwards, voltage is applied between the catalyst ink 22 and the electrolyte membrane 4 under hydrogen ambient atmosphere (which is humidified), while the pressing state is maintained, as shown in FIG. 9C. As a result, proton conduction paths are formed at the boundary between the catalyst ink 22 and the electrolyte membrane 4. Further, the solvent 24 of the catalyst ink 22 vaporizes during the voltage application, whereby the catalyst layers 10, 14 are formed on the both sides of the electrolyte membrane 4, as shown in FIG. 9D. Hydrogen diffuses to holes formed in these catalyst layers 10, 14, so as to form additional proton conduction paths. Further, proton conduction paths are reproduced within the electrolyte membrane 4 and within the electrolyte 23 of the catalyst layers 10, 14. Thus, according to the third variation, an advantageous result similar to that achieved in the first embodiment can be obtained.

(Fourth Variation)

Figure 10A:
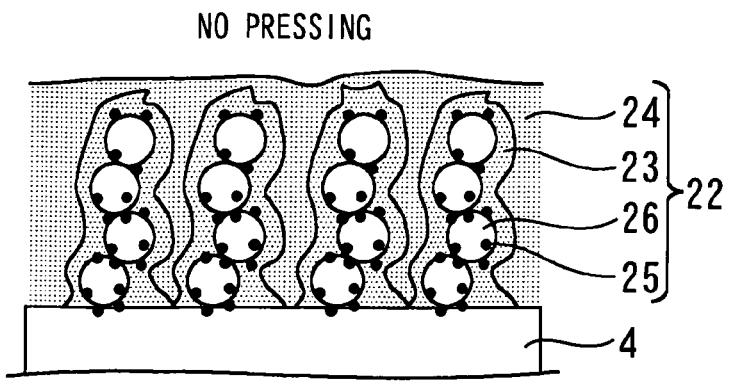
FIGS. 10A to 10C are sectional views for describing a manufacturing method of an MEA according to the fourth variation of the first embodiment of the present invention.
Figure 10B:
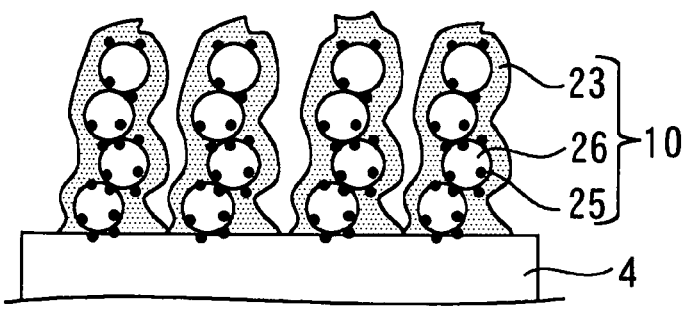
Figure 10C:
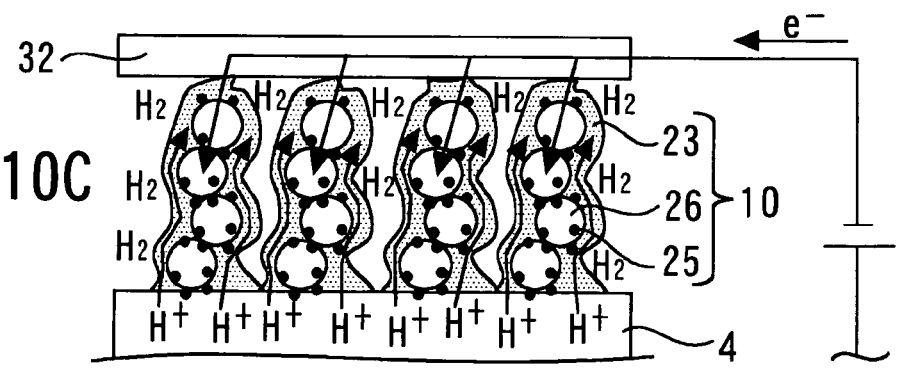

In the above described first embodiment, the catalyst layers 10, 14 are gotten into the electrolyte membrane 4 physically by pressing, so as to enlarge the contact surface between the catalyst layers 10, 14 and the electrolyte membrane 4. However, the pressing may be omitted. FIGS. 10A to 10C are cross sectional views for describing a manufacturing method of an MEA according to the fourth variation of the first embodiment. In FIGS. 10A to 10C, only upper part than the electrolyte membrane 4 (the catalyst layer 10 side) is shown, as similar as in FIG. 9.

According to the fourth variation, catalyst ink 22 is applied by a spray method to both sides of the electrolyte membrane 4 at first, as shown in FIG. 10A. Then, the solvent 24 of the applied catalyst ink 22 was vaporized, so as to form the catalyst layers 10, 14, as shown in FIG. 10B. Afterwards, the catalyst layers 10, 14 and the electrolyte 4 are pinched by the plates 32, 34. Then, voltage is applied between the catalyst layers 10, 14 and the electrolyte membrane 4 under hydrogen ambient atmosphere (which is humidified), as shown in FIG. 10C. Even in a case where no pressing is performed, the proton conduction paths are formed at the boundaries between the catalyst layers 10, 14 and the electrolyte membrane 4, although the contact surface between the catalyst layers 10, 14 and the electrolyte membrane 4 decreases as compared to that obtained in a case where pressing is performed. In other words, more proton conduction paths are uniformly formed as compared to those which are formed when the power is generated in the above described comparative example. Further, it is possible to reproduce the proton conduction paths within the electrolyte membrane 4 and within the electrolyte 23 of the catalyst layers 10, 14. Accordingly, the fourth variation can decrease the proton conduction resistance.

(Fifth Variation)

Although the catalyst layers 10, 14 are formed by evaporating the solvent from the catalyst ink 22 in the above described embodiment, the present invention can be applied to a case in which pre-formed catalyst layers 10, 14 are employed.

According to the fifth variation, layered structure as shown in FIG. 2B can be obtained by providing the catalyst layers 10, 14 on the both sides of the electrolyte membrane 4. Afterwards, the catalyst layers 10, 14 are pinched by the plates 32, 34 so as to be pressed, as shown in FIG. 3A. Then, the catalyst layers 10, 14 are applied with voltage under hydrogen atmosphere (which is humidified) while still being pressed, as shown in FIG. 3B. As a result, proton conduction paths are formed at the boundaries between the catalyst layers 10, 14 and the electrolyte membrane 4. Accordingly, the fifth variation can achieve the same advantageous result as the above described first embodiment.

Second Embodiment

Next, second embodiment of the present invention will be described with reference to FIG. 11.

In the above described first embodiment, the catalyst ink 22 is applied on the electrolyte membrane 4, before vaporizing the solvent 24 of the applied catalyst ink 22 so that the catalyst layers 10, 14 are formed.

Meanwhile, an electrolyte membrane may be formed in some cases by applying electrolytic solution on a catalyst layer, before vaporizing the solvent of the applied electrolytic solution. The present invention can be applied to such a case.

Figure 11A:
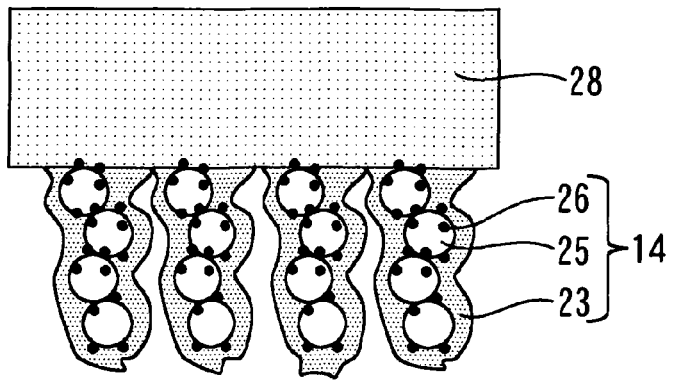
FIGS. 11A to 11C are sectional views for describing a manufacturing method of an MEA according to a second embodiment of the present invention.
Figure 11B:
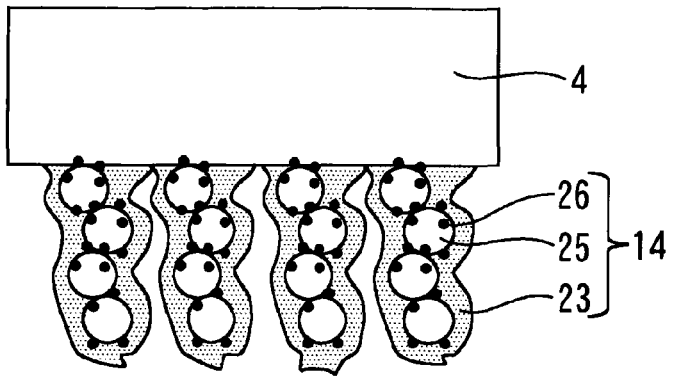
Figure 11C:
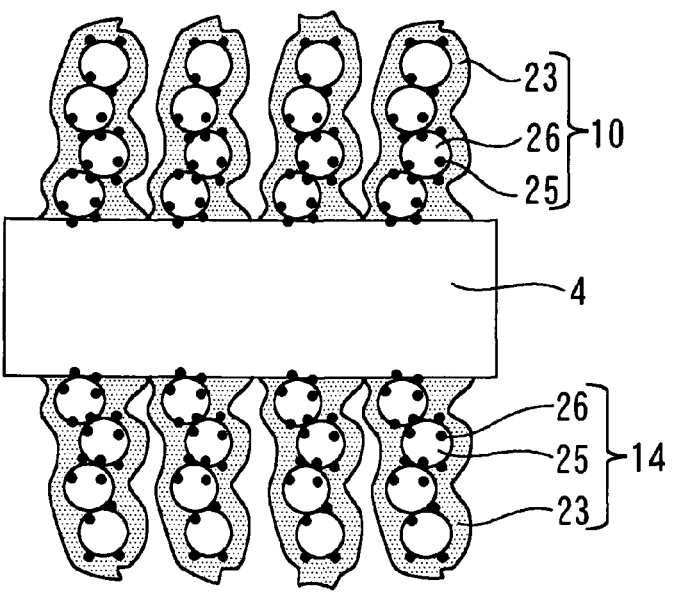

FIGS. 11A to 11C are cross sectional views for describing a manufacturing method of an MEA according to the second embodiment. In the second embodiment, electrolytic solution 28 is firstly applied on a catalyst layer 14 including electrolyte 23 and conductive supports 25 supporting catalyst 26 (in other words, including no solvent), as shown in FIG. 11(A). It is not illustrated, but electrolytic solution 28 includes solvent and electrolyte (e.g., Nafion) having proton permeability.

Next, an electrolyte membrane 4 is formed on the catalyst layer 14 by vaporizing the solvent of the applied electrolytic solution 28, as shown in FIG. 11B. As the manner for vaporize the solvent, the manner for vaporizing the solvent 24 of the catalyst ink 22 can be employed. Afterwards, catalyst layer 10 which is the same as the catalyst layer 14 is provided on the electrolyte membrane 4, as shown in FIG. 11C.

Further, the catalyst layers 10, 14 are pinched from top and bottom and pressed by the plates 32, 34 (see FIG. 3A) by the manner explained with the detailed description of the first embodiment 1. Then, the electrolyte membrane 4 and the catalyst layers 14, 10 are applied with voltage under hydrogen atmosphere (which is humidified) while being pressed, as shown in FIG. 3B. When such a voltage application is performed, protons are transmitted from the catalyst layer 14 toward the electrolyte membrane 4, and further transmitted from the electrolyte membrane 4 toward the catalyst layer 10. As a result, sulfonate groups which contributes to conduction of protons gather while making their direction the same, so as to form proton conduction paths at the boundary of the catalyst layer 14 and the electrolyte membrane 4 as well as at the boundary of the electrolyte membrane 4 and the catalyst layer 10. Even more particularly, superior proton conduction paths can be obtained also within the catalyst layers 10, 14 and the electrolyte membrane 4. More concretely, proton conduction paths destroyed within the electrolyte 23 or the electrolyte membrane 4 are reproduced.

As same as the case in the above described first embodiment, the voltage application and the pressing are finished when preset voltage applying time elapses from the start of the voltage application so as to obtain the MEA. At this stage, the sulfonate groups which gather during the voltage application at the boundaries between the catalyst layers 10, 14 and the electrolyte membrane 4 while making their directions the same will be intertwined with each other. Accordingly, a state in which the proton conduction paths are kept is maintained even after the voltage application and the pressing are finished.

As discussed above, in the second embodiment of the preset invention, the catalyst layer 10 is formed on the electrolyte membrane 4, after the electrolyte membrane 4 is formed on the catalyst layer 14 from the electrolytic solution 28, as different from the case in the above described first embodiment. Afterwards, likewise the above described first embodiment, voltage was applied under hydrogen ambient atmosphere (which is humidified) while the catalyst layers 10, 14 are pinched and pressed by the plates 32, 34. As a result, proton conduction paths can be formed at the boundaries between the catalyst layers 10, 14 and the electrolyte membrane 4. Further, proton conduction paths can be reproduced within the electrolyte membrane 4 and within the electrolyte 23. Cell voltage can be reduced by forcibly forming the proton conduction paths as described above. It is, therefore, possible to improve the power generation characteristics of the fuel cells.

Figure 12A:
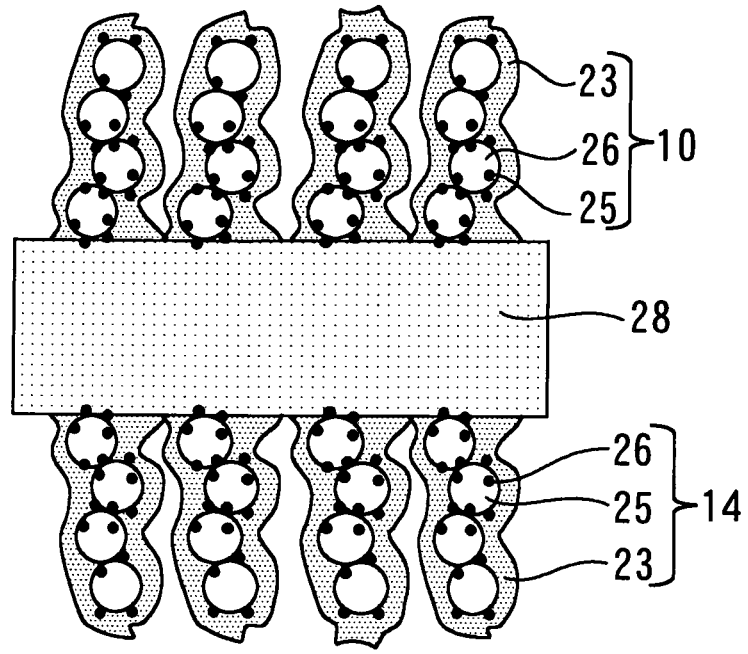
FIGS. 12A and 12B are sectional views for describing a manufacturing method of an MEA according to a variation of the second embodiment of the present invention.
Figure 12B:
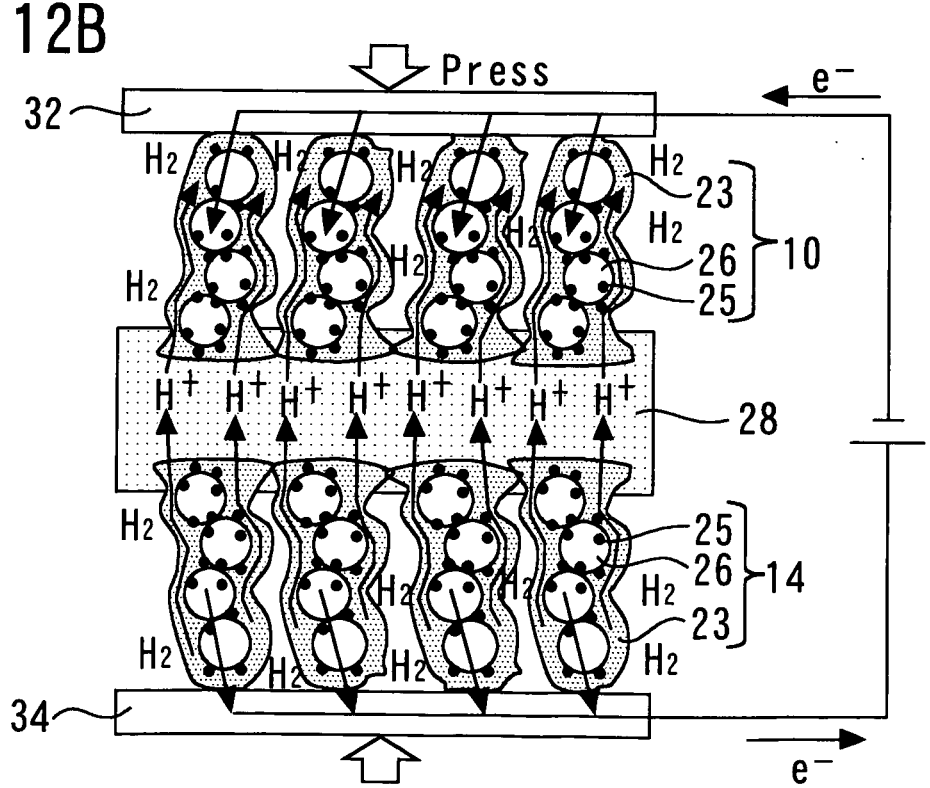

In the above described second embodiment, the pressing is performed after vaporizing the solvent of the electrolytic solution 28. However, the pressing may be performed before vaporizing the solvent of the electrolytic solution 28, with providing the catalyst layer 10 before the vaporization, as shown in FIGS. 12A and 12B. FIGS. 12A and 12B are cross sectional views figure for describing a manufacturing method of an MEA according to a variation of the second embodiment.

In the variation of the second embodiment, the electrolytic solution 28 is applied to the catalyst layer 14 at first, as in the above described second embodiment (see FIG. 11A). Next, as shown in FIG. 12A, a catalyst layer 10 same as the catalyst layer 14 is placed on the electrolytic solution 28 including the solvent.

Afterwards, the catalyst layers 10, 14 are pressed from top and bottom while the electrolytic solution 28 still includes the solvent. In other words, as shown in FIG. 12 B, catalyst layers 10, 14 sandwiching the electrolytic solution 28 are pinched and pressed by the plates 32, 34 from top and bottom. As a result, the catalyst layers 10, 14 get into the electrolytic solution 28 physically. Further, voltage is applied under hydrogen atmosphere (which is humidified) to the catalyst layers 10, 14 that are still kept pressed. Thus, proton conduction paths are formed at the boundary between the catalyst layer 14 and the electrolytic solution 28 as well as the boundary between the electrolytic solution 28 and the catalyst layer 10. An electrolyte membrane 4 is formed as shown in FIG. 3B, since the solvent of the electrolytic solution 28 evaporates during the voltage application. According to the present variation, therefore, achieves the same advantageous result as the above described second embodiment does, since the proton conduction paths are formed at the boundaries between the catalyst layers 10, 14 and the electrolyte membrane 4.

In the above described second embodiment and the variation, the catalyst layers 10, 14 are physically gotten into the electrolyte membrane 4 (or the electrolytic solution 28) by the pressing to increase the contact surface between the catalyst layers 10, 14 and the electrolyte membrane 4 (or, the electrolytic solution 28). However, as in the above described first embodiment or the fourth variation, the pressing may be omitted.

The major benefits of the present invention described above are summarized as follows:

According to a first, third or fourth aspect of the present invention, proton conduction paths are formed at the boundary between the catalyst layer and the electrolyte membrane when the voltage is applied between the catalyst layer and the electrolyte membrane under the atmosphere of the proton supplying source. The resistance of the fuel cells, that is, proton conduction resistance at the boundary between the catalyst layer and the electrolyte membrane can be lowered by employing such a membrane electrode assembly having the proton conduction paths. It is, therefore, possible to improve the power generation characteristics of the fuel cells, since cell voltage of the fuel cells can be raised.

According to a second aspect of the present invention, proton conduction paths are formed at the boundary between the catalyst ink and the electrolyte membrane when the voltage is applied between the catalyst ink and the electrolyte membrane under the atmosphere of the proton supplying source. The resistance of the fuel cells, that is, proton conduction resistance at the boundary between the catalyst layer and the electrolyte membrane can be lowered by employing such a membrane electrode assembly having the proton conduction paths. It is, therefore, possible to improve the power generation characteristics of the fuel cells, since cell voltage of the fuel cells can be raised.

According to a fifth aspect of the present invention, proton conduction paths are formed at the boundary between the catalyst layer and the electrolytic solution when the voltage is applied between the catalyst layer and the electrolytic solution under the atmosphere of the proton supplying source. The resistance of the fuel cells, that is, proton conduction resistance at the boundary between the catalyst layer and the electrolyte membrane can be lowered by employing such a membrane electrode assembly having the proton conduction paths. It is, therefore, possible to improve the power generation characteristics of the fuel cells, since cell voltage of the fuel cells can be raised.

According to a sixth, seventh or eighth aspect of the present invention, the voltage is applied under a state where the catalyst layer and the electrolyte membrane are pinched and pressed. As a result, wider contact surface is obtained between the catalyst layer and the electrolyte membrane, whereby more proton conduction paths are formed, as compared to the first, third or fourth aspect of the present invention. Accordingly, it is possible to further improve the cell voltage of the fuel cells.

According to a ninth aspect of the present invention, the voltage is applied under a state where the catalyst ink and the electrolyte membrane are pinched and pressed. As a result, wider contact surface is obtained between the catalyst ink and the electrolyte membrane, whereby more proton conduction paths are formed, as compared to the second aspect of the present invention. Accordingly, it is possible to further improve the cell voltage of the fuel cells.

According to a ninth aspect of the present invention, the voltage is applied under a state where the catalyst layer and the electrolytic solution are pinched and pressed. As a result, wider contact surface is obtained between the catalyst layer and the electrolytic solution, whereby more proton conduction paths are formed, as compared to the fifth aspect of the present invention. Accordingly, it is possible to further improve the cell voltage of the fuel cells.

Further, the present invention is not limited to these embodiments, but variations and modifications may be made without departing from the scope of the present invention.

The invention claimed is:

1. A manufacturing method of a membrane electrode assembly for fuel cells, comprising the steps of:
    applying catalyst ink including solvent, electrolyte having proton permeability, and a conductive support supporting catalyst on at least one surface of an electrolyte membrane having proton permeability;
    forming a catalyst layer including said electrolyte and said conductive support by evaporating the solvent included in the applied catalyst ink; and
    applying voltage between said catalyst layer and said electrolyte membrane under atmosphere of proton supplying source, wherein the voltage is applied to said catalyst layer under hot pressing through a pair of electrically conductive plates that pinch the catalyst layer.

2. A manufacturing method of a membrane electrode assembly for fuel cells, comprising the steps of:

provided a catalyst layer including electrolyte having proton permeability and a conductive support supporting catalyst on at least one surface of an electrolyte membrane having proton permeability; and applying voltage between said catalyst layer and said electrolyte membrane under atmosphere of proton supplying source, wherein the voltage is applied to said catalyst layer under hot pressing through a pair of electrically conductive plates that pinch the catalyst layer.

3. The manufacturing method of a membrane electrode assembly according to claim 1, wherein the voltage is applied under a state where said catalyst layer and said electrolyte membrane are pinched and pressed.

4. The manufacturing method of a membrane electrode assembly according to claim 2, wherein the voltage is applied under a state where said catalyst layer and said electrolyte membrane are pinched and pressed.

* * * * *